(12) United States Patent
    Ovsiannikov et al.

(10) Patent No.: US 10,547,830 B2
(45) Date of Patent: Jan. 28, 2020

(54) APPARATUS FOR AND METHOD OF ILLUMINATION CONTROL FOR ACQUIRING IMAGE INFORMATION AND DEPTH INFORMATION SIMULTANEOUSLY

(71) Applicant: Samsung Electronics Co., Ltd., Gyeonggi-do (KR)

(72) Inventors: Ilia Ovsiannikov, Studio City, CA (US); Yibing Michelle Wang, Temple City, CA (US); Peter Deane, Menlo Park, CA (US)

(73) Assignee: Samsung Electronics Co., Ltd (KR)

( * ) Notice: Subject to any disclaimer, the term of this patent is extended or adjusted under 35 U.S.C. 154(b) by 605 days.

(21) Appl. No.: 14/989,554

(22) Filed: Jan. 6, 2016

(65) Prior Publication Data
    US 2017/0142406 A1    May 18, 2017

Related U.S. Application Data

(60) Provisional application No. 62/255,656, filed on Nov. 16, 2015.

(51) Int. Cl.
    *H04N 13/257*    (2018.01)
    *G03B 35/02*     (2006.01)
    *H04N 13/254*    (2018.01)
    *G01B 11/25*     (2006.01)
    *H04N 13/296*    (2018.01)
    *G03B 35/08*     (2006.01)
    (Continued)

(52) U.S. Cl.
    CPC ....... *H04N 13/254* (2018.05); *G01B 11/2513* (2013.01); *H04N 13/257* (2018.05); *H04N 13/296* (2018.05)

(58) Field of Classification Search
    CPC .......... H04N 13/0253; H04N 13/0257; H04N 13/0296; H04N 13/0246; H04N 5/2254; H04N 5/23232; H04N 5/2354; H04N 5/335; H04N 13/0214; H04N 13/0217; H04N 13/02; H04N 13/0203; H04N 13/0207; H04N 13/021; H04N 13/0221;
    (Continued)

(56) References Cited

U.S. PATENT DOCUMENTS

6,101,269 A    8/2000 Hunter et al.
6,754,370 B1   6/2004 Hall-Holt et al.
    (Continued)

FOREIGN PATENT DOCUMENTS

WO    WO 98/28593    7/1998

*Primary Examiner* — Christopher S Kelley
*Assistant Examiner* — Kathleen M Walsh
(74) *Attorney, Agent, or Firm* — The Farrell Law Firm, P.C.

(57) ABSTRACT

An apparatus and a method are provided. The apparatus includes a light source configured to project light in a changing pattern that reduces the light's noticeability; collection optics through which light passes and forms an epipolar plane with the light source; and an image sensor configured to receive light passed through the collection optics to acquire image information and depth information simultaneously. The method includes projecting light by a light source in a changing pattern that reduces the light's noticeability; passing light through collection optics and forming an epipolar plane between the collection optics and the light source; and receiving in an image sensor light passed through the collection optics to acquire image information and depth information simultaneously.

20 Claims, 12 Drawing Sheets

(51) Int. Cl.
　　　*G03B 35/10*　　(2006.01)
　　　*H04N 13/207*　(2018.01)
(58) Field of Classification Search
　　　CPC ........... H04N 13/0222; G01B 11/2513; F16M
　　　　　　　　11/10; F16M 11/18; F16M 11/2014;
　　　　　　　　F16M 2200/041; G03B 15/03; G03B
　　　　　　　　33/14; G03B 35/00; G03B 35/02; G03B
　　　　　　　　35/04; G03B 35/06; G03B 35/08; G03B
　　　　　　　　35/10; G03B 35/12; A61B 6/022; B60R
　　　　　　　　　　　　　　　　　　　　　　　　2300/107
　　　USPC ..................................................... 348/46, 49
　　　See application file for complete search history.

(56) References Cited

U.S. PATENT DOCUMENTS

| | | | |
|---|---|---|---|
| 7,440,590 B1 * | 10/2008 | Hassebrook | G01B 11/2513 345/582 |
| 8,150,142 B2 | 4/2012 | Freedman et al. | |
| 8,773,514 B2 | 7/2014 | Gharib et al. | |
| 9,019,267 B2 | 4/2015 | Gurman | |
| 2004/0213463 A1 * | 10/2004 | Morrison | G01B 11/25 382/210 |
| 2007/0057946 A1 | 3/2007 | Albeck et al. | |
| 2011/0079714 A1 * | 4/2011 | McEldowney | G01J 3/02 250/332 |
| 2012/0200829 A1 * | 8/2012 | Bronstein | G02B 27/2271 353/7 |
| 2014/0055771 A1 * | 2/2014 | Oggier | G01S 17/36 356/5.01 |
| 2014/0240461 A1 * | 8/2014 | Russell | H04N 13/254 348/46 |
| 2015/0062306 A1 * | 3/2015 | Ayyagari | H04N 5/372 348/49 |
| 2015/0070489 A1 | 3/2015 | Hudman et al. | |
| 2015/0281676 A1 * | 10/2015 | Koehle | H04N 13/254 348/49 |
| 2017/0108332 A1 * | 4/2017 | Cossairt | G01B 11/2513 |

\* cited by examiner

APPARATUS FOR AND METHOD OF ILLUMINATION CONTROL FOR ACQUIRING IMAGE INFORMATION AND DEPTH INFORMATION SIMULTANEOUSLY

PRIORITY

This application claims priority under 35 U.S.C. § 119(e) to a U.S. Provisional Patent Application filed on Nov. 16, 2015 in the United States Patent and Trademark Office and assigned Ser. No. 62/255,656, the entire contents of which are incorporated herein by reference.

BACKGROUND OF THE DISCLOSURE

Field of the Disclosure

The present disclosure relates generally to an apparatus for and a method of illumination control for acquiring image information and depth information simultaneously, and more particularly, to an apparatus for and a method of illumination control for acquiring image information and depth information simultaneously while obfuscating an illumination pattern.

Description of the Related Art

Three-dimensional (3D) imaging systems are increasingly being used in a wide variety of applications such as, for example, high speed 3D imaging systems for advanced driver assistant systems (ADAS) and high speed 3D imaging systems for autonomous navigation.

In stereoscopic imaging or stereo vision systems, two cameras—typically displaced horizontally from one another—are used to obtain two differing views on a scene or a 3D object in the scene. By comparing these two images, the relative depth information can be obtained for the 3D object. Stereo vision is highly important in fields such as human-computer interfacing—e.g. to recognize human gestures, pose, image user in the shape of 3D avatar—and robotics, to extract information about the relative position of 3D objects in the vicinity of autonomous systems/robots. Other applications for robotics include object recognition, where stereoscopic depth information allows a robotic system to separate occluding image components, which the robot may otherwise not be able to distinguish as two separate objects—such as one object in front of another, partially or fully hiding the other object. 3D stereo displays are also used in entertainment and automated systems.

In a structured light (SL) approach, the 3D shape of an object may be measured using projected light patterns and a camera for imaging. In the SL method, a known pattern of light—often grids or horizontal bars or patterns of parallel stripes or random star field—is projected onto a scene or a 3D object in the scene. The projected pattern may get deformed or displaced when striking the surface of the 3D object. Such deformation may allow an SL vision system to calculate the depth and surface information of the object. Thus, projecting a narrow band of light onto a 3D surface may produce a line of illumination that may appear distorted from other perspectives than that of the projector, and can be used for geometric reconstruction of the illuminated surface shape. The SL-based 3D imaging may be used in different applications such as, for example, in consumer game systems to recognize and track player's body skeleton inline inspection of components during a production process, in health care for live measurements of human body shapes or the micro structures of human skin, and the like.

Present cameras that acquire color images and determine depth (i.e., RGBZ cameras) include two sensors, one for acquiring a color image and one for determining depth of objects in the image. Cameras with multiple sensors have increased cost, size, and power consumption. In addition, present cameras that determine depth, determine one distance for each location in a scene.

SUMMARY

According to an aspect of the present disclosure, an apparatus is provided. The apparatus includes a light source configured to project light in a changing pattern that reduces the light's noticeability; collection optics through which light passes and forms an epipolar plane with the light source; and an image sensor configured to receive light passed through the collection optics to acquire image information and depth information simultaneously.

In accordance with another aspect of the present disclosure, a method is provided. The method includes projecting light by a light source in a changing pattern that reduces the light's noticeability; passing light through collection optics and forming an epipolar plane between the collection optics and the light source; and receiving in an image sensor light passed through the collection optics to acquire image information and depth information simultaneously.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
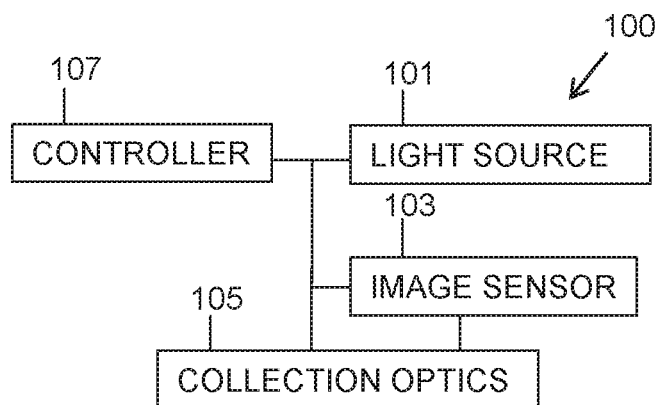
FIG. 1 is a block diagram of an illumination control apparatus according to an embodiment of the present disclosure.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist the overall understanding of the embodiments of the present disclosure. Therefore, it should be apparent to those skilled in the art that various changes and modifications of the embodiments described herein may be made without departing from the scope and spirit of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout the specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the spirit and the scope of the present disclosure.

Although terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of additional one or more other features, numerals, steps, operations, structural elements, parts, or combinations thereof.

Unless defined differently, all terms used herein have the same meanings as those understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure.

An aspect of the present disclosure provides an apparatus for and a method of illumination control for image sensing, simultaneous color and depth imaging, reducing power consumption, improving depth image quality, obfuscating illumination, removing interference, and assigning multiple distances to a scene location.

FIG. 1 is a block diagram of an apparatus 100 according to an embodiment of the present disclosure. The apparatus 100 acquires image information and depth information simultaneously.

Referring to FIG. 1, the apparatus 100 includes, but is not limited to, a light source 101, an image sensor 103, collection optics 105, and a controller 107.

In an embodiment of the present disclosure, the light source 100 illuminates a scene with at least one illumination dot at a predetermined angle. The light source 100 may be, but is not limited to a laser light source.

The image sensor 103 is placed at an offset from the light source 101. For example, the image sensor 103 may be placed at a horizontal offset from the light source 101 in the range of from 0.01 m to 0.5 m. However, the present disclosure is not limited to a horizontal offset or an offset in the range of 0.01 m to 0.1 m. Other orientations and ranges of offsets may be used in an embodiment of the present disclosure. The image sensor 103 is described below in greater detail with reference to FIG. 2.

The collection optics 105 is positioned with respect to the image sensor 103 to collect light from at least the light source 101 that reflects off objects in a scene and to project such light onto the image sensor 103. In an embodiment of the present disclosure, the collection optics 105 may be, but is not limited to, a lens positioned in front of the image sensor 103. The collection optics 105 may be at a predetermined angle with respect to the image sensor 103. The collection optics 105 may be a focusing lens or a glass/plastics surface that concentrates reflected light received from an illuminated object onto the image sensor 103. In an embodiment of the present disclosure, a convex structure may be used as a focusing lens. However, any other suitable lens design may be selected for the collection optics 105.

The controller 107 is connected to the light source 101, the image sensor 103, and the collection optics 105 to control the operation of the light source 101 (e.g., control when the light source 101 projects at least one illumination dot, the angle at which the at least one illumination dot is projected, the number and angle at which additional illumination dots are projected, the number of frames of at least one illumination dot), the image sensor 103, and the collection optics 105 (e.g., control the angle of collection).

Figure 2:
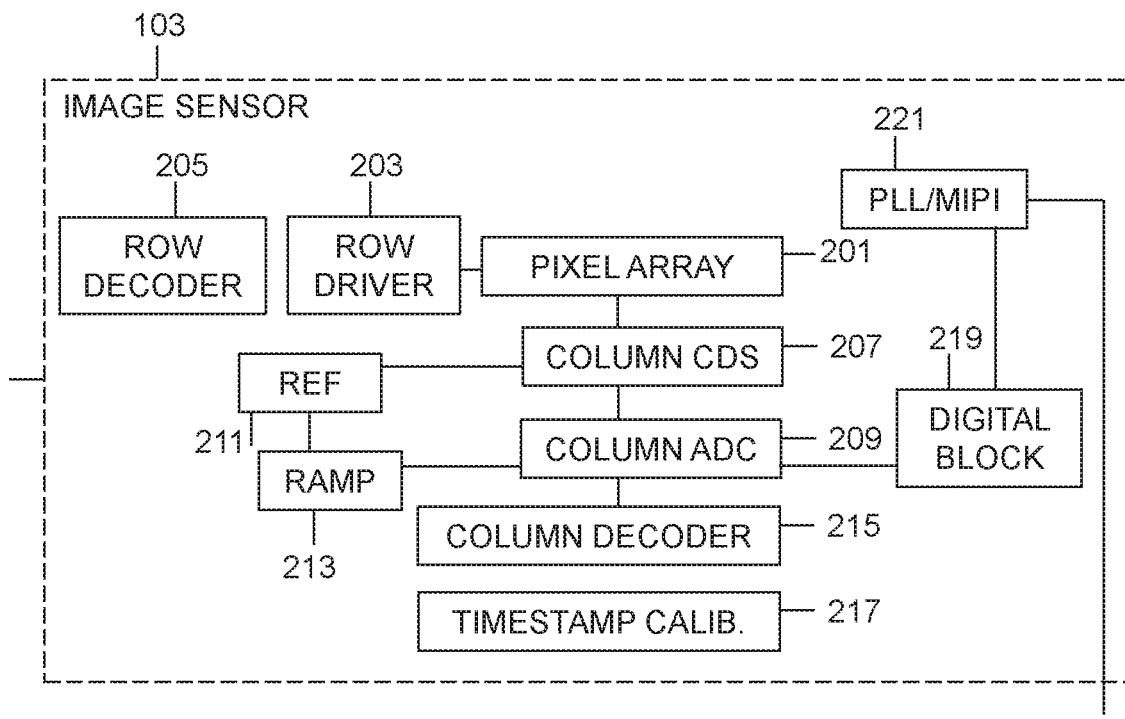
FIG. 2 is a block diagram of an image sensor of FIG. 1 according to an embodiment of the present disclosure.

FIG. 2 is a block diagram of the image sensor 103 of FIG. 1, according to an embodiment of the present disclosure.

Referring to FIG. 2, the image sensor 103 includes, but is not limited to, a pixel array 201, a row driver 203, a row decoder 205, a column CDS 207, a column analog-to digital converter (ADC) 209, a reference generator 211, a RAMP generator 213, a column decoder 215, a timestamp calibrator 217, a digital block 219, and a phase-locked loop (PLL)/

Mobile Industry Processor Interface (MIPI) 221. The pixel array 201 converts the light signals into electronic signals and stores them temporarily. The row driver 203, row decoder 205 and the column decoder 215 determine the order of the pixel array signals to be read out. The column CDS 207 performs correlated double sampling for the singles of the pixel array in order to remove reset noise. The column ADC 209 converts the analog output signal from the CDS block 207 into digital codes, which may be the brightness of the color information in 2D mode or the timestamp information in 3D mode. The RAMP generator 213 generates the required reference voltage for the ADC 209, which may vary by time or be constant. The reference generator 211 generates all the voltage and current references for the other blocks. The digital block 219 generates control signals for all the rest of the blocks and formats the ADC 209 outputs for output. The PLL/MIPI block 221 generates master clock of the whole system and output the formatted digital signals from the digital block 219. The timestamp calibrator 217 is used to improve the timestamp accuracy in 3D mode.

In an embodiment of the present disclosure, the pixel array 201 includes, but is not limited to, a plurality of pixel cells arranged in rows and columns for collecting light incident on the image sensor 103 (e.g., light from the light source 101 that reflects off objects in a scene). The pixel array 201 is described below in more detail with reference to FIGS. 3 and 4. The pixel array 201 includes, but is not limited to, an input for selecting one of several rows of the pixel array 201 and an output for outputting pixel data concerning objects.

Objects illuminated by at least one illumination dot in a scene are imaged on the rows of the pixel array. As described in more detail below with reference to FIGS. 5 and 6, during most of the time, rows record, line by line, an image of a scene (e.g., a color or red-green-blue (RGB) image), while at other times rows record depths of objects in the scene.

The row decoder 205 receives a signal from the controller 107 indicating which row of the pixel array 201 is selected, and outputs a signal for selecting the indicated row. The row driver 203 includes, but is not limited to, an output connected to the input of the pixel array 201 for providing signals and voltage levels necessary to select the indicated row (e.g., a row select signal (RSEL), a reset signal (RST), a transfer signal (TX), and a power supply voltage VDD for the pixel cell of FIG. 4 described below.

The column CDS 207 includes, but is not limited to, a first input connected to the output of the pixel array 201 for receiving pixel data concerning objects, a second input for receiving a reference voltage, and an output connected to the input of the first column ADC 209. The column ADC 209 converts pixel data from the pixel array 201 concerning objects to digital codes representing either a color image or a depth of an object in the scene from which light was reflected. The voltage reference 211 and the RAMP 213 provide a voltage levels to the column CDS 207 and the column ADC, respectively.

The column decoder 215 receives an input from the controller 107 indicating the columns to be selected and selects outputs from ADC 207. The timestamp calibrator 217 calibrates the timestamps associated with light incident on the pixel array 201.

The digital block 219 receives the output of the column ADC 209 and performs calculations including timing generation and depth calculation. The digital block 219 receives a periodic signal from the PLL/MIPI 221 and provides output data to the PLL/MIPI 221.

Figure 3:
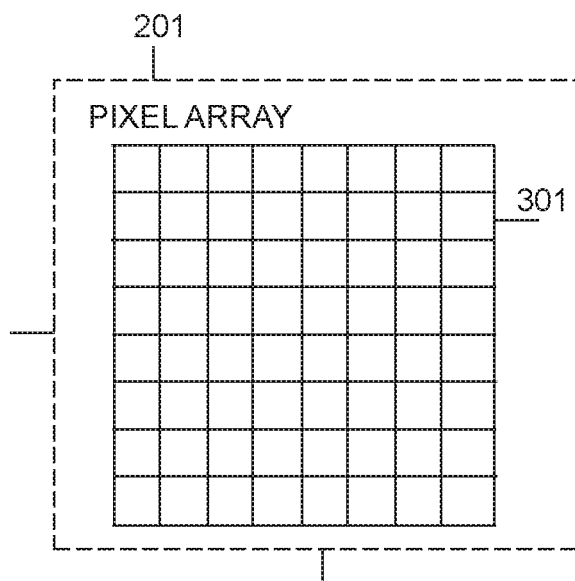
FIG. 3 is an illustration of a pixel array of the image sensor of FIG. 2 according to an embodiment of the present disclosure.

FIG. 3 is an illustration of the pixel array 201 of the image sensor 103 of FIG. 2 according to an embodiment of the present disclosure. The pixel array 201 receives light reflected off objects for which image information and depth information is acquired simultaneously.

Referring to FIG. 3, the pixel array 201 includes, but is not limited to, a plurality of pixel cells 301 arranged inn columns and m rows, where n and m are each pre-determined integers. For ranging or depth calculation based on triangulation, the pitch of the pixel cells 301 determines the maximum ranging resolution. The smaller the pixel pitch the higher the ranging resolution based on triangulation. For example, the pitch of the pixel cells may be in the range of 1 micron to 10 microns. However, the present disclosure is not limited to this range of pixel pitches, and any other suitable pixel pitch may be used.

The light received from an illuminated object may be focused onto one or more pixel cells 301 of the pixel array 201 via the collection optics 105 of the apparatus 100. The pixel array 201 may be an RGB pixel array, in which different pixel cells 301 may collect light signals of different colors. The pixel array 201 may be any 2D sensor such as, for example, a two dimensional (2D) red-green-blue (RGB) sensor with an infrared (IR) cut filter, a 2D IR sensor, a 2D near IR (NIR) sensor, a 2D red-green-blue-white (RGBW) sensor, a 2D RGB-IR sensor, and the like. The pixel array 201 may be used for 2D RGB color imaging of an object (or a scene containing an object) as well as for three dimensional (3D) imaging involving depth measurement of an object.

Figure 4:
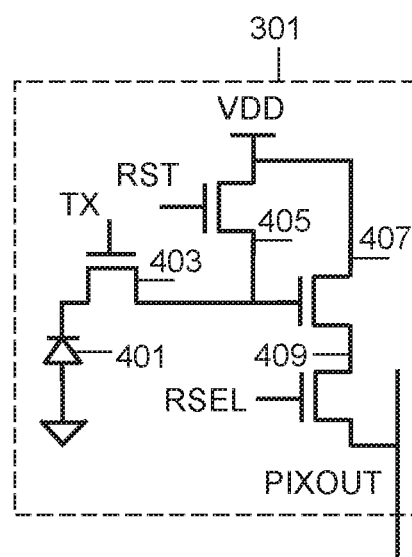
FIG. 4 is a schematic drawing of a pixel cell of the pixel array of FIG. 3 according to an embodiment of the present disclosure.

FIG. 4 is a schematic drawing of a pixel cell 301 of the pixel array 201 of FIG. 3 according to an embodiment of the present disclosure. For example, the pixel cell 301 may include, but is not limited to, a four transistor pinned photodiode (4T PPD) pixel cell.

Referring to FIG. 4, each pixel cell 301 includes, but is not limited to, a pinned photo-diode (PPD) 401 and first to fourth n-channel metal oxide semiconductor (NMOS) field effect transistors (FETs) 403, 405, 407, and 409. Other types of pixel cells may be used as the pixel cell 301, such as a three transistor (3T) pixel, which omits the first NMOS transistor 403 of the 4T PPD. In addition, a one transistor (1T) pixel or a two transistor (2T) pixel may be used as the pixel cell 301. Furthermore, the pixel cell 301 may have a shared-transistor pixel configuration, where transistors and readout circuitry can be shared among two or more neighboring pixel cells 301. In a shared-transistor pixel configuration, each pixel cell 301 may have at least one photo-diode and one transfer-gate transistor, where the other transistors can be shared among two or more pixels cells 301. A shared transistor pixel cell may be a 2-shared (1×2) 2.5 transistor pixel cell where five transistors are used for two pixels cells, resulting in a 2.5 transistors/pixel cell. In addition, a shared-transistor pixel cell may be used. For example, a 1×4 4-shared pixel cell, in which 4 pixels cells share the readout circuitry may be used, where each pixel cell has at least one photo-diode and one transfer-gate transistor.

The PPD 401 includes, but is not limited to, an anode connected to a ground potential and a cathode. The PPD 401 converts photons incident on the PPD 401 into electrons, thereby converting an optical input signal into an electrical signal in the charge domain.

The first NMOS transistor 403 includes, but is not limited to, a source terminal connected to the cathode of the PPD 401, a gate terminal for receiving a transfer signal (TX), and a drain terminal connected to a source terminal of the second NMOS transistor 405 and a gate terminal of the third NMOS transistor 407. The first NMOS transistor 403 is turned on to transfer the photon-generated electrons from the PPD 401 to the second terminal of the first NMOS transistor 403.

The second NMOS transistor 405 includes, but is not limited to, a drain terminal connected to a power supply voltage (e.g., VDD) and a drain terminal of the third NMOS transistor 407, a gate terminal for receiving a reset signal (RST), and a source terminal connected to the drain terminal of the first NMOS transistor 403 and the gate terminal of the third NMOS transistor 407. The RST signal resets the PPD 401 to a pre-determined high voltage level (e.g., logic level 1 voltage) when RST and TX are each a high voltage level to turn on the second NMOS transistor 405 and the first NMOS transistor 403, respectively.

The third NMOS transistor 407 includes, but is not limited to, a drain terminal connected to a power supply voltage (e.g., VDD) and the drain terminal of the drain terminal of the second NMOS transistor 405, a gate terminal connected to the drain terminal of the first NMOS transistor 403 and the source terminal of the second NMOS transistor 405, and a source terminal connected to a drain terminal of the fourth NMOS transistor 409.

The fourth NMOS transistor 409 includes, but is not limited to, a drain terminal connected to the source terminal of the third NMOS transistor 407, a gate terminal for receiving a row select signal (RSEL), and a source terminal connected to the pixel output (PIXOUT) of the pixel cell 301. The RSEL signal transfers the voltage corresponding to the optical signal incident on the PPD 401 when RSEL is a high voltage level and RST is a low voltage level to turn on the fourth NMOS transistor 409 and turn off the second NMOS transistor 405, respectively.

Figure 5:
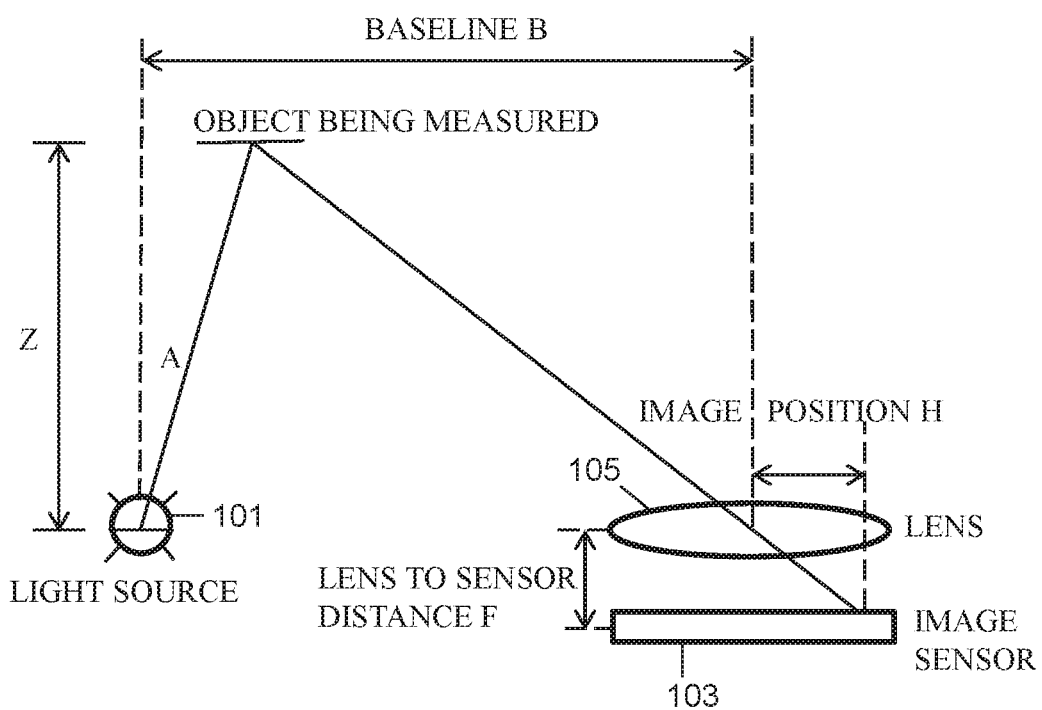
FIG. 5 is an illustration of acquiring image information and depth information simultaneously according to an embodiment of the present disclosure.

FIG. 5 is an illustration of acquiring image information and depth information simultaneously according to an embodiment of the present disclosure. The color image and depth information may be simultaneous as perceived by the user. Thus, two image sensors are not required, which reduces the expense and the power consumption associated with a second image sensor.

Referring to FIG. 5, the light source 101 projects (or scans) light at an angle A that reflects off an object at a depth Z from the light source 101. The collection optics 105 (e.g. a lens) collects light reflected off the object, where the collection optics 105 is a baseline B away from the light source, and where the light source 101, the collection optics 105 and a row in the image sensor 103 form an epipolar line therebetween. The image sensor 103, which is a focal length F away from the collection optics 105, receives light incident upon at least one pixel cell 301 in the pixel array 201 of the image sensor 103. The image sensor may simultaneously record an image and a depth of an object in a scene from which light from the light source 101 is reflected, where depth is determined by triangulation.

Typically, a scene is scanned with illumination to acquire a 3D image. If the same locations are illuminated with dots of illumination (e.g. a grid of illumination dots) from frame to frame, the illumination dots may be noticed by an observer. Usually, illumination dots are faint and are not noticed by an observer. In some circumstances (e.g. in a dark environment) an observer may notice a grid of illumination dots, which might inconvenience the observer and/or make the observer feel uncomfortable. An observer may also notice a grid of illumination dots if the grid moves, because human eyesight is sensitive to movement and to the movement of a pattern. The scan angle A causes light to be incident on a row of pixels 301 of the image sensor 103. In other words, a row of pixels 301 in the image sensor 103 corresponds to a scanning plane of a scene. The time of reception of light in the image sensor 103 is recorded with a timestamp. Depth is determined using a look-up table (LUT). That is, for a given light source scan angle A, each pixel cell 301 location is associated with a particular depth. Thus, if a pixel cell 301 receives light then the depth associated with the pixel cell 301 may be determined using the LUT. One row of pixel cells 301 in the image sensor 103 corresponds to one scanning plane of the light source 101. The image sensor 103 may be positioned so that the rows of pixel cells 301 in the image sensor 103 follow the epipolar line of a scanning plane. Depth accuracy is determined by the baseline size, spatial resolution of the image sensor 301 and the angular resolution of the light source 101.

Figure 6:
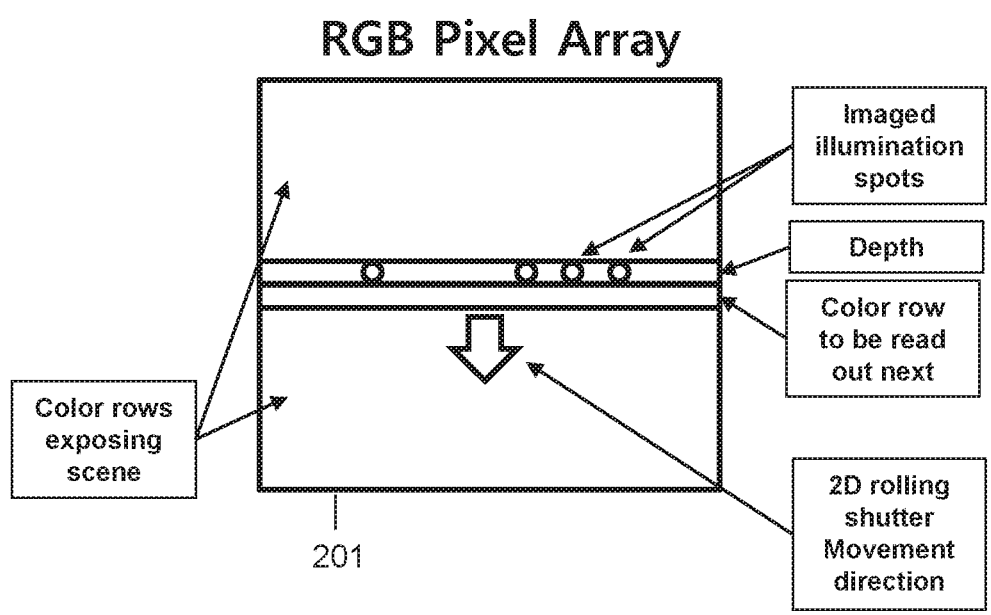
FIG. 6 is an illustration of acquiring image information and depth information simultaneously in rows of the pixel array of FIG. 3 according to an embodiment of the present disclosure.

FIG. 6 is an illustration of acquiring image information and depth simultaneously from a user point of view, in rows of the pixel array 201 of FIG. 3 according to an embodiment of the present disclosure. The pixel array 201 may acquire both image information (e.g. RGB image information) and depth information simultaneously.

Referring to FIG. 6, different rows of the pixel array 201 may be temporarily assigned to record either image information or depth information. In an embodiment of the present disclosure, the rows may be, but are not limited to, alternatively recording image information and depth information simultaneously.

For example, the lower of the two rows in the pixel array shown in FIG. 6 acquires image information, whereas the higher of the two rows acquires depth information. Depth information is acquired when light (e.g. laser light) from the light source 101 reflects off an object in a scene and is incident on a pixel in a row, where the row corresponds to a scan line in a scene, and where the row is associated with an epipolar line between the light source 101 and the image sensor 103. The position of the pixel that collects information is related to the depth of the object in the scene, based on triangulation of the light from the light source and the locations of the light source, the object from which light is reflected, and the image sensor which receives the reflected light. The depths associated with the pixel cell 301 positions may be stored in a LUT and referred to when determining the depth of an object from which a reflection is received. Once the laser source scans across the entire scene, such that the upper of the two rows in FIG. 6 images the reflected laser dots for depth calculation—and once the lower of the two rows imaged in FIG. 6 capturing color image has been read—the depth-and-color capture process moves on to the next row, i.e., the upper of the two rows stops capturing depth and resumes capturing color image, while the lower of the two rows stops capturing color image and begins capturing depth image.

Figure 7:
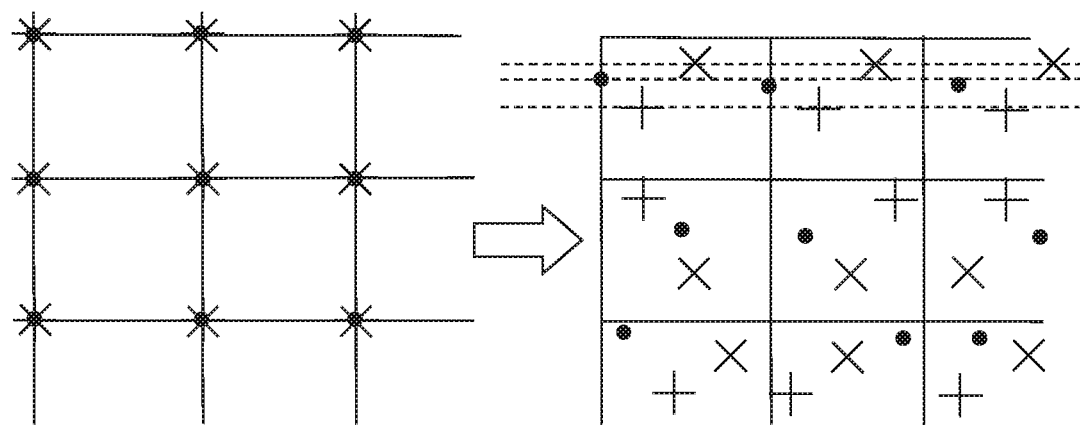
FIG. 7 is an illustration of changing an illumination pattern according to an embodiment of the present disclosure.

FIG. 7 is an illustration of changing an illumination pattern according to an embodiment of the present disclosure. Changing the illumination pattern makes the illumination pattern less likely to be noticed by an observer, because less optical power is concentrated at a location. The effect of spreading an illumination dot over an area will appear to the user as uniform, structureless illumination having orders of magnitude lower brightness as compared to the brightness of a single illumination dot whose location is not spread over an area.

The locations of illumination dots may changed by changing the timing of the light source 101 and the image sensor 103.

Referring to FIG. 7, an example of a first illumination pattern on the right side of FIG. 7 includes, but is not limited to, illumination dots, represented with a ".", an "x", and a "+," in a grid pattern that does not change from frame to frame over three frames. Each group of three ".", "x", and "+" indicates three illumination dots occupying the same grid locations in three frames, respectively.

A second illumination pattern on the right side of FIG. 7 is an example of how the first illumination pattern may be changed to spread out the illumination pattern over an area so that the illumination dots do not overlap from frame to frame and is, therefore, much less likely to be noticed by an observer. In the example shown, each of the three dots in each group is given a unique location. The locations of the dots may be changed horizontally only, vertically only, or both horizontally and vertically. In addition, locations of the dots may be random or pseudo-random within a frame, between frames, or both within a frame and between frames.

Randomizing illumination dots improves an observer's comfort level, because human vision is especially sensitive to structured patterns and structured patterns in motion. Randomizing an illumination pattern makes it harder to recognize the structure of a pattern. In an embodiment of the present disclosure, illumination dots may be randomly spread so that they either do not overlap with a previous illumination dot or do not overlap with a previous illumination dot for at least a predetermined period of time, number of frames, or both. By spreading the location of an illumination dot pseudo-randomly, the user will not notice a regularly structured mesh grid.

An observer in a scene may not notice an illumination pattern if the pattern is not projected onto the observer's eyes. In an embodiment of the present disclosure, the image sensor 103 may acquire an image of a user in a scene, identify the location of the user's eyes using the acquired image, and either cause the light source 101 to not project illumination into the observer's eyes when the observer's eyes are in a scan line, while continuing to illuminate other locations in the scan line where the observer's eyes are not located to acquire a 3D image and depth information, or project a sufficient amount of light into the observer's eyes so that the illumination pattern is not noticeable to the observer in comparison.

If an observer's eyes are not illuminated, then distance information to the observer's eyes is not acquired. The distance information for an observer's eyes may be approximated from the depth image of the rest of the observer's face. Not determining the depth of the observer's eyes does not negatively affect the quality of face/eye tracking, because the face and eyes appear in the color and/or depth image information. Thus, tracking the location of the observer's eyes may continue.

Figures 8, 9:
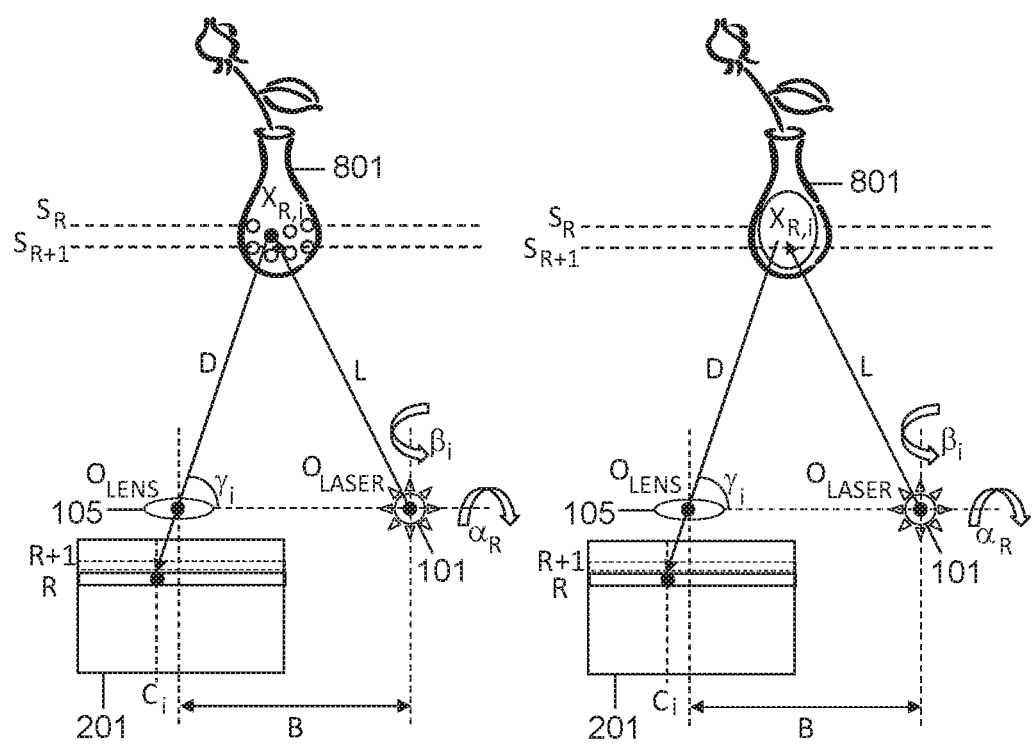
FIG. 8 is an illustration of acquiring image information and depth information simultaneously using a grid pattern according to an embodiment of the present disclosure.
FIG. 9 is an illustration of acquiring image information and depth information simultaneously while obfuscating an illumination pattern according to an embodiment of the present disclosure.

FIG. 8 is an illustration of acquiring an image information and depth information simultaneously using a grid pattern according to an embodiment of the present disclosure. The grid pattern used in FIG. 8 does not change from frame to frame and, therefore, may be noticed by an observer.

Referring to FIG. 8, the light source 101 (e.g. $O_{LASER}$) and the collection optics 105 (e.g. $O_{LENS}$) are spaced a distance B apart along an epipolar line. The $O_{LASER}$ 101 projects light at an angle, where the angle may be changed vertically $\beta_i$ and horizontally $\alpha_R$, in a line L along scanning lines (e.g., $S_R$ and $S_{R+1}$). The light may reflect off an object 801 (e.g., a vase) at different locations $X_{R,i}$. Light reflecting off the object 801 may travel along a line D, pass through the $O_{LENS}$ 105 and be recorded in a row (e.g., row R or row R+1) of the pixel array 201 of the image sensor 103. Different rows in the pixel array 201 may be used for acquiring image information and acquiring depth information. For example, scan line $S_R$ may be associated with row R, light source elevation angle $\alpha_R$ and may be used to acquire image information (i.e., light reflected off an object 801 that is scanned along line $S_R$ may be acquired in row R of the pixel array 201 to acquire an image of the object 801 off which light is reflected). In addition, scan line $S_{R+1}$ may be associated with light source elevation angle $\alpha_{R+1}$ and row R+1 of the pixel array 201 and used to acquire depth information (i.e., light reflected off the object 801 that is scanned along line $S_{R+1}$ may be acquired in row R+1 of the pixel array 201 to acquire the depth of the object 801 off of which light is reflected). Each position of a pixel cell 301 in a row used to acquire depth information may be associated with a depth in a LUT. Thus, the position $C_1$ of a pixel cell 301 that received light reflected off the object 801 indicates the depth of the object 801. Since the illumination grid pattern does not change from frame to frame, an observer may notice the grid pattern.

FIG. 9 is an illustration of acquiring an image information and depth information simultaneously using a grid pattern according to an embodiment of the present disclosure. The grid pattern used in FIG. 9 changes from frame to frame and may be a pattern that is less structured than a grid (e.g. a pseudo-random pattern where the illumination spots are changed, vertically only, horizontally only, or both vertically and horizontally). Therefore, an observer may not notice the pattern.

Referring to FIG. 9, the arrangement and operation of FIG. 9 is the same as in FIG. 8, except that the illumination is not a grid pattern that does not change from frame to frame, but is a pattern that, if noticed by an observer at all, may appear as uniform, structureless illumination, as described above with reference to FIG. 7. Comfort of an observer increases as the noticeability of the illumination decreases.

Changing or jittering the location of an illumination spot pseudo-randomly blurs the projected illumination dots and makes the illumination appear uniform. In an embodiment of the present disclosure, a scan angle and a corresponding receiving row number of the pixel array 201 of the image sensor 103 may be randomized. In an embodiment of the present disclosure, the location of an illumination dot is changed from frame to frame so that the illumination dot from one frame to another is spread over a larger local area over time and the observer does not notice a pattern of illumination dots. Spreading illumination dots over a larger area over time reduces the amount of optical power at any one location, provides the appearance that the brightness of the illumination is reduced, and makes the illumination pattern less noticeable to an observer.

In an embodiment of the present disclosure, the location of an illumination dot may be changed in only the horizontal direction, in only the vertical direction, or in both the horizontal direction and the vertical direction. In an embodiment of the present disclosure, the location of an illumination dot may be changed by changing the timing of the light source 101 and the image sensor 103.

Figure 10:
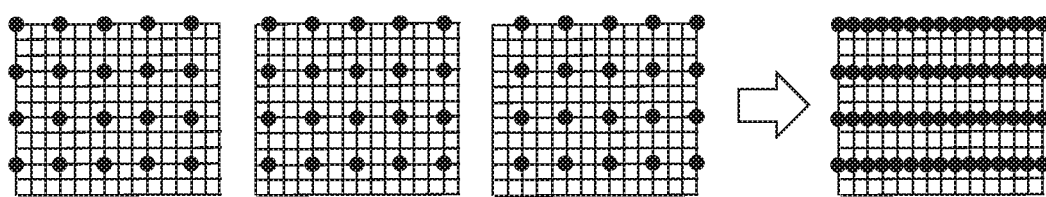
FIG. 10 is an illustration of interleaving sequential scanning patterns to increase spatial resolution according to an embodiment of the present disclosure.

FIG. 10 is an illustration of interleaving sequential scanning patterns to increase spatial resolution according to an embodiment of the present disclosure. While spreading illumination dots to acquire image information and depth information simultaneously as described above with reference to FIG. 7 reduces the noticeability of the illumination pattern, it may also change the spatial resolution of the acquired image information and depth information.

The spatial resolution of image information and depth information acquired simultaneously by spreading illumination dots may be increased by interleaving a predetermined number of frames of acquired image information and depth information to reduce the spacing between the illumination dots in the interleaved frames.

Referring to FIG. 10, three frames, for example, use the same illumination pattern, but with an offset between each frame, where each of the three frames have the same spacing between illumination dots (or interrogation points) and, therefore, the same spatial resolution. By interleaving the three frames to result in a composite image of the three individual frame, the spacing between the accumulated illumination dots is reduced, which results in a higher spatial resolution for the interleaved frames without increasing the number of illumination dots per frame. In an embodiment of the present disclosure, the locations of an illumination dot may be randomized to increase spatial resolution.

In an embodiment of the present disclosure, an interrogation rate of a scene is determined by the speed at which a scene is scanned by the light source 101 (e.g. a laser), the time at which a row of the pixel array 201 of the image sensor 103 row is read, and the resolution of a time (e.g. timestamp resolution) at which a pixel cell 301 in the image sensor 103 receives light reflecting off an object in a scene. A depth spatial resolution is determined by the interrogation rate. A slower interrogation rate indicates a lower depth spatial resolution.

Figure 11:
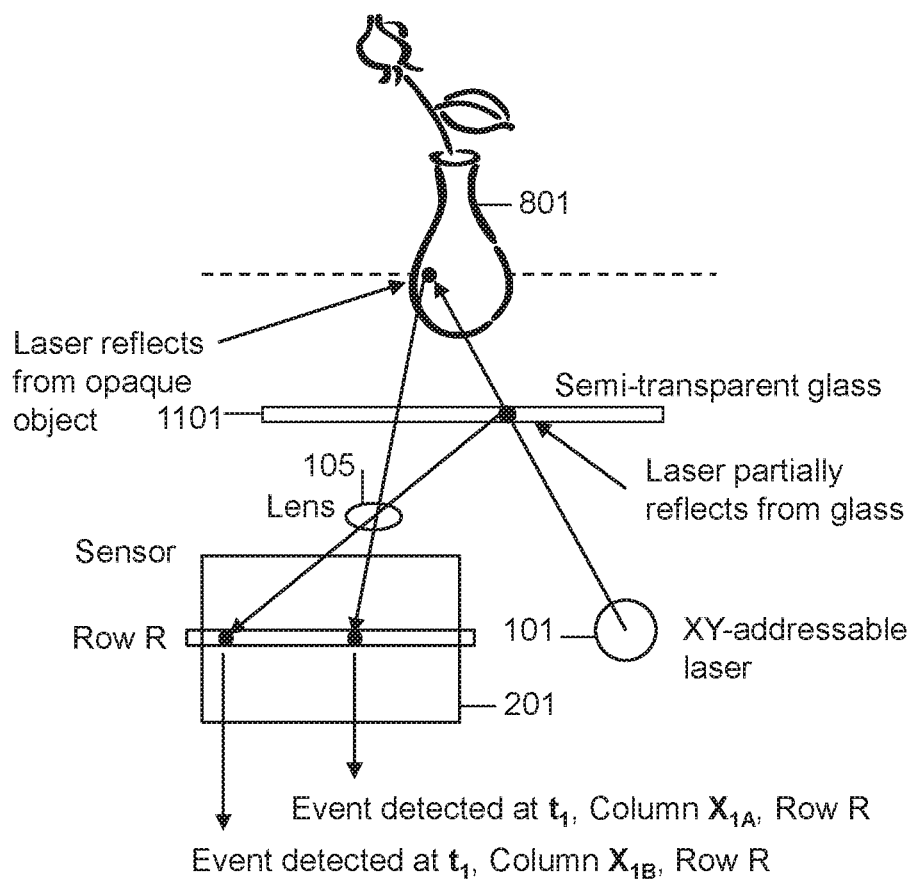
FIG. 11 is an illustration of acquiring image information and multiple depth information simultaneously of different objects at an illumination location according to an embodiment of the present disclosure.

FIG. 11 is an illustration of acquiring image information and multiple depth information of different objects at an illumination location according to an embodiment of the present disclosure. For example, if an object 801 is behind a semi-transparent material 1101 (e.g. glass, plastic, fog, rain), a depth (or distance) may be determined to both the object 801 and to the semi-transparent material 1101. This is because reflections from the semi-transparent material 1101 and the object 801 behind the semi-transparent material 1101 are each incident on a pixel cell 301 in a row of the pixel array 201 of the image sensor 103, but in different columns of the row, which represent different depths.

Referring to FIG. 11, the image sensor 103 detects both reflections (or events), where both events will have substantially the same timestamp for the arrival times of the reflections at the image sensor 103. The image sensor 103 calculates, based on the columns in the pixel array 201 in which the reflections are stored, and outputs a depth for each event. However, the semi-transparent material 1101 must be capable of causing a reflection to be incident upon the image sensor 103 and to allow a reflection from the object 801 behind the semi-transparent material 1101 to cause a reflection to be incident upon the image sensor 103.

The light source 101 (e.g. an XY-addressable laser) creates a luminescent trace as it travels through the semi-transparent material 1101. This causes illumination to be incident upon a sequential range of sensor pixels 201 in a row R of the image sensor 103 (e.g. starting from column $X_{1A}$ to column $X_{1B}$).

The image sensor 103 detects events in columns $X_{1A}$ ... $X_{1B}$. Each event will have substantially the same timestamp. The image sensor will calculate and output a depth for each event. A LUT may be used to calculate a depth corresponding to a column in the pixel array 201.

Figure 12:
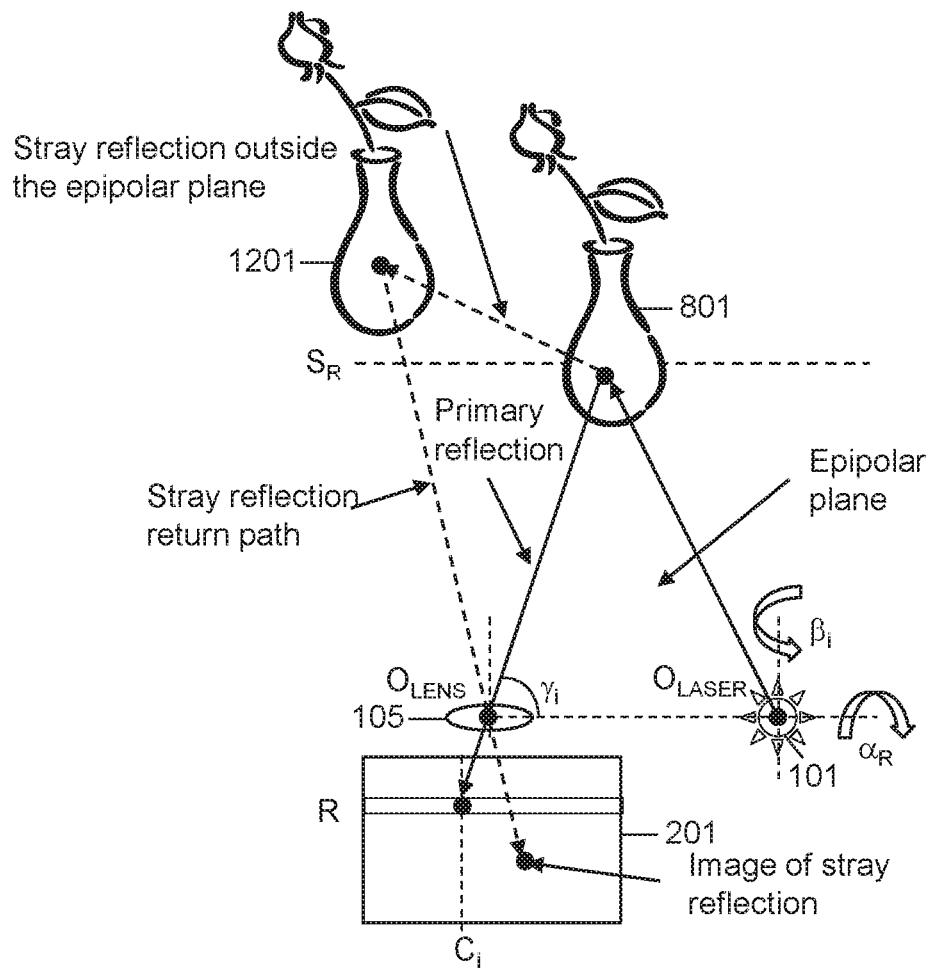
FIG. 12 is an illustration of acquiring image information and depth information simultaneously without being affected by a stray reflection path according to an embodiment of the present disclosure.

FIG. 12 is an illustration of acquiring image information and depth information simultaneously without being affected by a stray reflection path according to an embodiment of the present disclosure. In addition, if several illumination sources operate at the same time and in the same scene, interference may occur. In an embodiment of the present disclosure, image information and depth information may similarly be acquired simultaneously without being affected by a light from another light source (e.g. interference). To eliminate interference from another illumination source, an illumination scan angle of the light source 101 and a corresponding receiving row number of the pixel array 201 in the image sensor 103 are randomized.

Referring to FIG. 12, the pixel array 201 of the image sensor 103 only images an object that is within the epipolar plane formed with respect to the light source 101 and the image sensor 103. Thus, stray reflections (e.g. reflected/refracted illumination) or illumination from other devices that are outside of the epipolar plane are not imaged by the image sensor 103 and do not degrade the quality of the image information and depth information acquired simultaneously.

Figure 13:
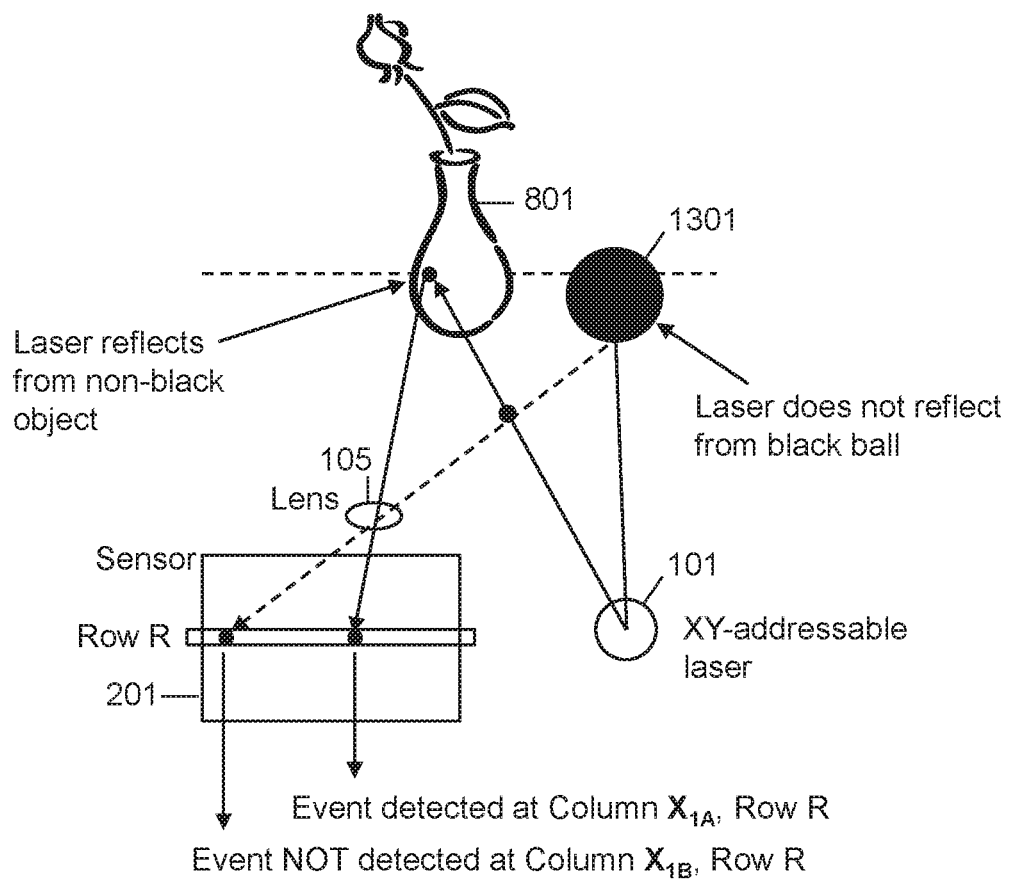
FIG. 13 is an illustration of acquiring image information and depth information simultaneously of different objects of different reflectivity according to an embodiment of the present disclosure.

FIG. 13 is an illustration of acquiring image information and depth information simultaneously of different objects of different reflectivity according to an embodiment of the present disclosure. For example, a black or low-albedo object does not reflect illumination well.

Referring to FIG. 13, the image sensor 103 may be unable to acquire image information or depth information of a low-albedo object (e.g. a timestamp is not generated when expected). The dotted line from the black ball 1301 to the pixel array 201 indicates an expected reflection that is not recorded in the pixel array 201. Thus, no timestamp is generated for the expected reflection. To increase depth image quality of a black object, the illumination power of the light source 101 is recorded when imaging high-albedo objects (e.g. objects that reflect illumination well, are easy to image, and may still be imaged if the power of the light source 101 is reduced).

Referring to FIG. 13, if timestamps are missed then that may indicate that the power of the light source is insufficient to acquire image information and depth information for a low-albedo object and that the power of the light source 101 should be increased.

Figure 14:
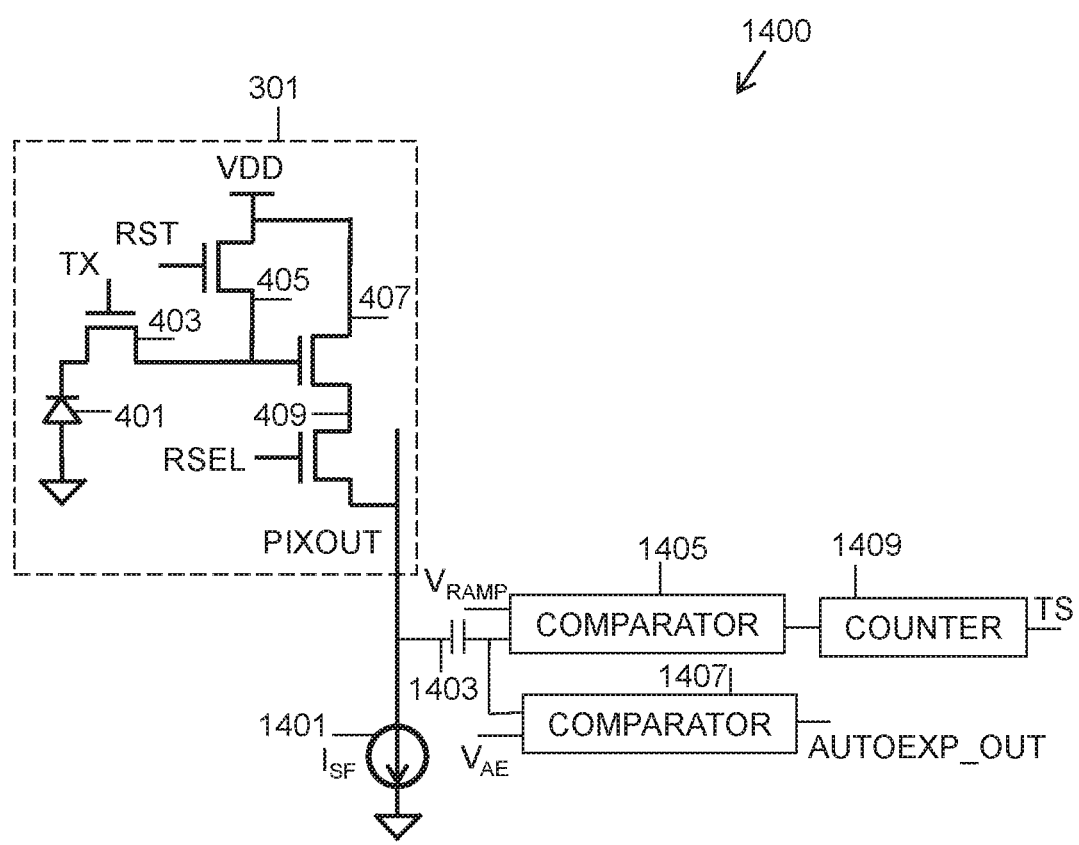
FIG. 14 is a block diagram of an apparatus for controlling power of an illumination source according to an embodiment of the present disclosure.

FIG. 14 is a block diagram of an apparatus 1400 for controlling power of an illumination source according to an embodiment of the present disclosure. Image quality degrades when an illumination dot does not have sufficient optical power. Conversely, when the optical power of an illumination dot is more than sufficient, power is unnecessarily consumed.

In an embodiment of the present disclosure, it is determined whether illumination is sufficient or not to acquire image information and depth information simultaneously. If the image information and the depth information can be reliably acquired, then the power of the light source 101 (e.g. a laser) may be reduced. If the image information and depth information cannot reliably be acquired then the power of the light source is increased.

Referring to FIG. 14, a pixel cell 301 in the pixel array 201 of the image sensor 103 is connected to a current source $I_{SF}$ 1401 and a first terminal of a capacitor 1403. The second end of the capacitor 1403 is connected to a first input of a first comparator 1405 and a first input of a second comparator 1407.

A first threshold $V_{RAMP}$ is connected to the second input of the first comparator 1405, and a second threshold $V_{AE}$ is connected to the second input of the second comparator 1407. The first threshold $V_{RAMP}$ is used to determine whether or not a timestamp is missed, and the second threshold $V_{AE}$ is used to determine whether or not power of the light source 101 is too high.

The output of the first comparator 1405 is connected to a counter 1409. The counter 1409 counts the number of timestamps received. By comparing the number of timestamps counted by the counter 1409 to the number of illumination dots projected by the light source 101, it can be determine if and which timestamps are missed. The output of the second comparator 1407 indicates whether or not the power of the light source 101 is too high.

If timestamps are missed, power to the light source 101 is increased during the next scan of the same area. If timestamps are not missed and it is indicated that the power of the light source 101 is too high, the power of the light source 101 is reduced during the next scan of the same area.

Cameras commonly exhibit the vignetting effect, where image brightness is reduced on the periphery of an image as compared to the center of the image. In an embodiment of the present disclosure, vignetting may be compensated for by increasing the power of the light source at the periphery of a scene.

If a timestamp is missed in a frame, power to the light source 101 may be increased temporarily (e.g., for 1 frame) for a predetermined number of spatially distributed sets of voxels, where a voxel indicates a horizontal angle and a vertical angle of the illumination source. Then, it is determined if a timestamp is generated as a result of increasing power to the light source 101. If so, imaging of the scene continues at the elevated power level in the vicinity of where the timestamps were missed before the power to the light source 101 is increased.

If no timestamps are missed then power to the light source may be too high and may be reduced.

Some filters largely block certain colors of light (e.g. a red/blue filter largely blocks green light). In an embodiment of the present disclosure, if an image sensor 103 can detect a certain color of light reflected from a filter that largely blocks that color of light without missing a timestamp, then the power to the light source may be too high and may be reduced.

In an embodiment of the present disclosure, the most recently scanned row may be used to set the power of the light source 101 for the next row to be scanned or next dot to be projected. This allows almost instantaneous control of power to the light source 101. In an embodiment of the present disclosure, a predetermined number of rows and/or frames may be used to determine the power of the light source 101 for the next row to be scanned.

Figure 15:
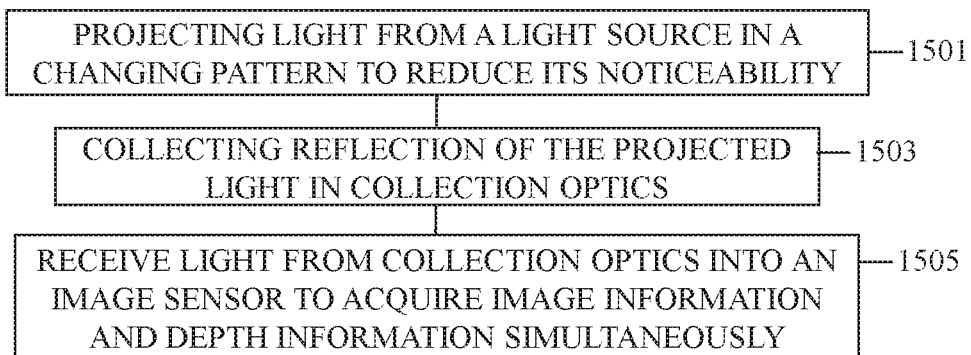
FIG. 15 is a flowchart of a method of acquiring image information and depth information simultaneously of different objects at an illumination location according to an embodiment of the present disclosure.

FIG. 15 is a flowchart of a method of acquiring image information and depth information simultaneously of different objects at an illumination location according to an embodiment of the present disclosure. A single image sensor 103 acquires both image information and depth information simultaneously and concurrently. Frame rate, phase of color, depth and point-of-view are fully synchronized. In an embodiment of the present disclosure, image information and depth images may be, but are not limited to, read out of the image sensor 103 in interleaved fashion (e.g, read a row of image information, then read a row of depth information).

Referring to FIG. 15, light is projected from a light source in a changing pattern to reduce its noticeability in step 1501. The projected light may have a pattern that changes vertically, horizontally, or both vertically and horizontally within a frame or from frame to frame, where the change may be random or pseudo-random. The illumination may change as a function of the timing of the light source and the image sensor. The light may not be projected into the eyes of a person in a scene or light may be projected into the eyes of the person in the scene to obfuscate the light pattern. The optical power of the projected light is increased for the next scan in the same area when a low-albedo object is detected or a timestamp is missed and is decreased when a high-albedo object is detected for the next scan in the same area. Optical power may be increased at the periphery to compensate for vignetting. Optical power may be decreased if no timestamp is missed in the presence of a filter that largely blocks the projected light. Optical power of a next projection of light may be determined by the optical power of at least one most recently projected light.

A reflection of the light off an object is collected by collection optics, where the light source and the collection optics form an epipolar line therebetween in step 1503.

The light collected by the collection optics is received in an image sensor to acquire image information and depth information simultaneously in step 1505, where the image sensor includes, but is not limited to, a pixel array, and where the image sensor receives image information in a row of the pixel array and depth information in another row of the pixel array. The depth of an object is determined by triangulation, where the position of reflected light in the pixel array indicates the depth of the object associated with the stored reflection. A LUT may be used to determine a depth associated with the location of a pixel in a row. Light stored in the pixel array may be interleaved on a frame basis to increase spatial resolution. The projection of light at one location in a scene may result in depth information for multiple objects because of the presence of a semi-transparent material at the one location. Reflections or other sources of light outside of an epipolar plane are ignored.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
    a light source configured to project light in a changing pattern that reduces the light's noticeability;
    collection optics through which light passes and forms an epipolar plane with the light source;
    an image sensor including a pixel array configured to receive light passed through the collection optics and acquire image information and depth information by:
        recording image information on a first row of the pixel array corresponding to first scan line and depth information on a second row of the pixel array corresponding to the first scan line of a scene; and
        recording image information on the second row of the pixel array corresponding to a second scan line and depth information on a third row of the pixel array corresponding to the second scan line of the scene after image information is recorded on the first row; and
    a controller configured to control the light source, the collection optics, and the image sensor.

2. The apparatus of claim 1, wherein the changing pattern changes in one of a vertical direction, a horizontal direction, or in both a vertical and a horizontal direction.

3. The apparatus of claim 1, wherein the changing pattern changes pseudo-randomly or randomly.

4. The apparatus of claim 1, wherein acquired image information and depth information from different frames are interleaved to increase spatial resolution.

5. The apparatus of claim 1, where the light is not projected in a person's eyes or light is projected in the person's eyes to obfuscate the changing pattern.

6. The apparatus of claim 1, wherein optical power of the light source is increased if a low-albedo object is detected and at least one timestamp associated with the changing pattern is missed, and wherein the optical power of the light source is decreased if a high-albedo object is detected and a timestamp associated with the changing pattern is not missed.

7. The apparatus of claim 1, wherein image information and depth information for a location is acquired for multiple objects due to a semi-transparent material.

8. The apparatus of claim 1, wherein image information and depth information outside of the epipolar plane are ignored.

9. The apparatus of claim 1, wherein depth information is determined by triangulation.

10. The apparatus of claim 1, wherein optical power of the light source for a next projection of light is determined based on at least one of a most recent projection of light.

11. A method, comprising:
projecting light by a light source in a changing pattern that reduces the light's noticeability;
passing light through collection optics and forming an epipolar plane between the collection optics and the light source;
receiving in an image sensor including a pixel array light passed through the collection optics, and;
acquiring image information and depth information by:
recording image information on a first row of the pixel array corresponding to a first scan line and depth information on a second row of the pixel array corresponding to the first scan line of a scene; and
recording image information on the second row of the pixel array corresponding to a second scan line and depth information on a third row of the pixel array corresponding to the second scan line of the scene after image information is recorded on the first row.

12. The method of claim 11, wherein the changing pattern changes in one of a vertical direction, a horizontal direction, or in both a vertical and a horizontal direction.

13. The method of claim 11, wherein the changing pattern changes pseudo-randomly or randomly.

14. The method of claim 11, further comprising interleaving the acquired image information and depth information from different frames to increase spatial resolution.

15. The method of claim 11, further comprising not projecting light in a person's eyes or projecting light in the person's eyes to obfuscate the changing pattern.

16. The method of claim 11, further comprising increasing optical power of the light source if a low-albedo object is detected and at least one timestamp associated with the changing pattern is missed, and wherein the optical power of the light source is decreased if a high-albedo object is detected and a timestamp associated with the changing pattern is not missed.

17. The method of claim 11, further comprising acquiring image information and depth information for multiple objects at a location due to a semi-transparent material.

18. The method of claim 11, further comprising ignoring image information and depth information outside of the epipolar plane.

19. The method of claim 11, further comprising determining depth information by triangulation.

20. The method of claim 11, further comprising determining optical power of the light source for a next projection of light based on at least one of a most recent projection of light.

* * * * *